Dec. 4, 1934.  C. G. MORTIMER  1,983,389
START AND STOP CONTROL FOR POWER MACHINES
Original Filed June 19, 1931   3 Sheets-Sheet 1
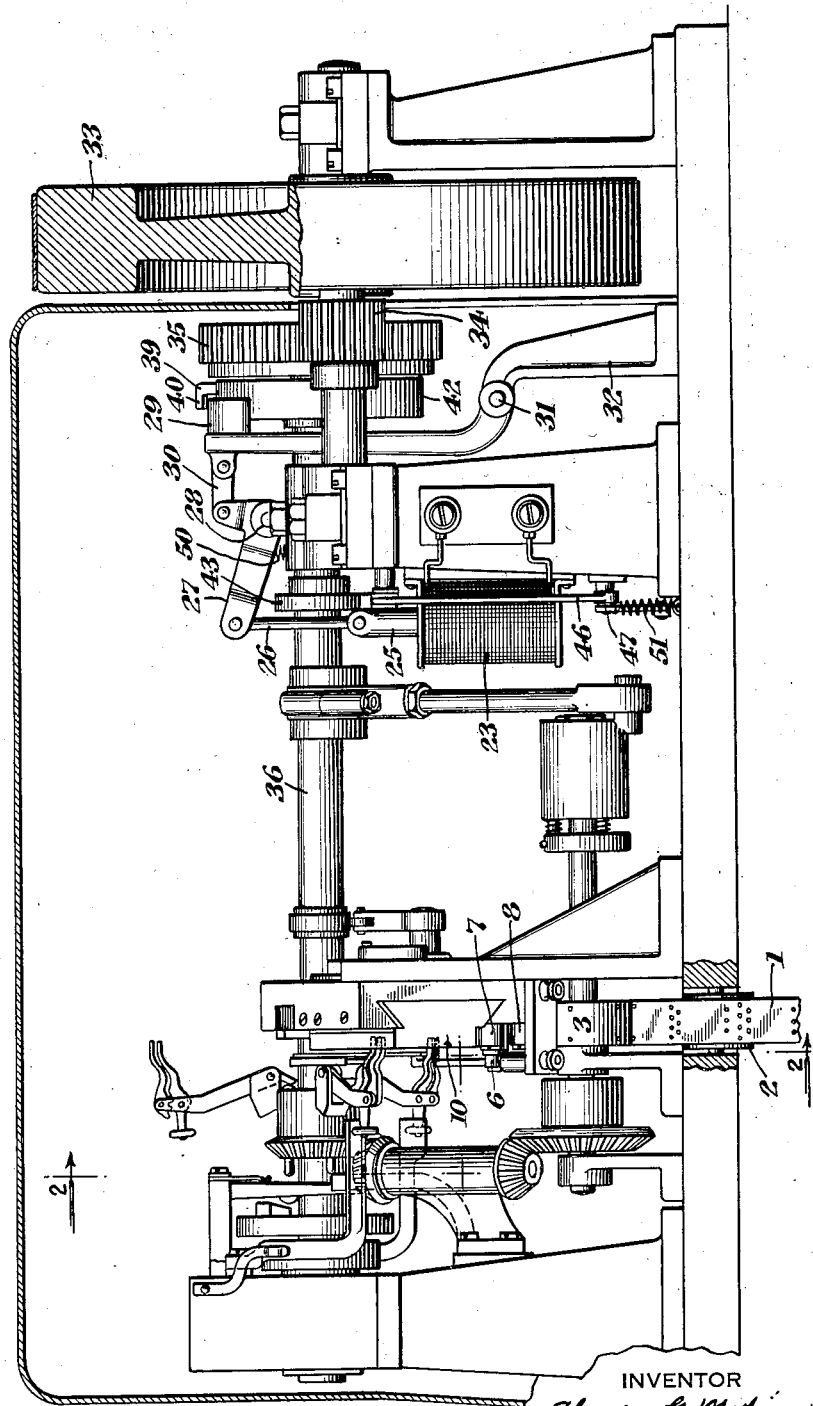
INVENTOR
Charles G. Mortimer
BY
ATTORNEYS Dec. 4, 1934.  C. G. MORTIMER  1,983,389
START AND STOP CONTROL FOR POWER MACHINES
Original Filed June 19, 1931  3 Sheets-Sheet 2
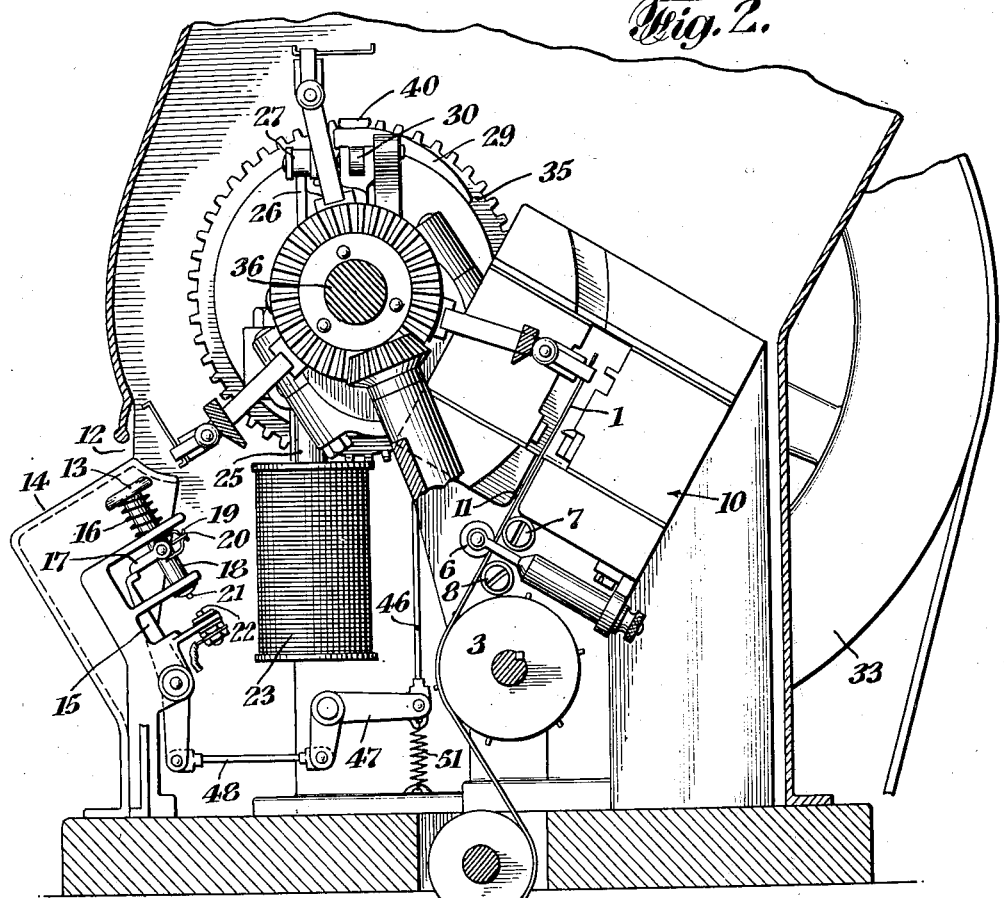
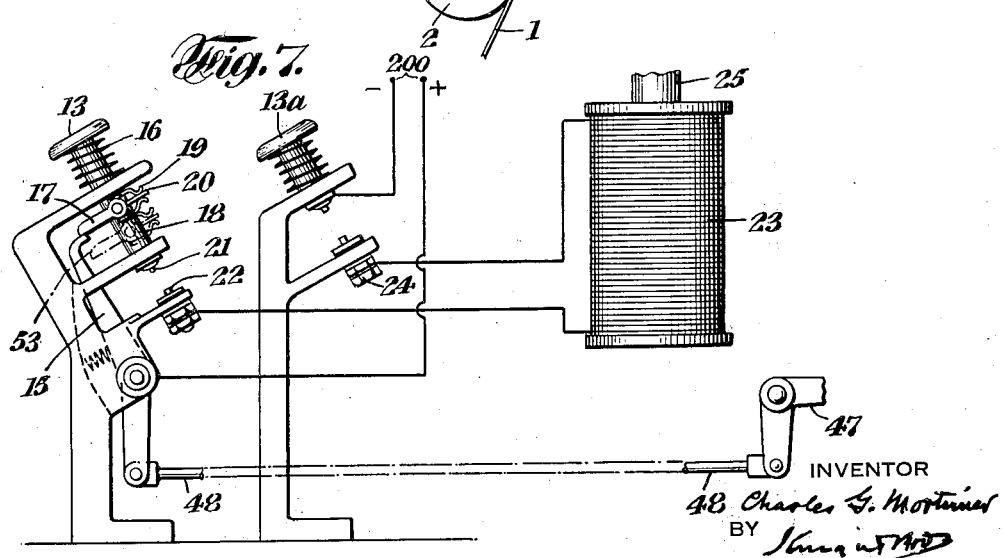
INVENTOR
Charles G. Mortimer
BY
ATTORNEYS Dec. 4, 1934. C. G. MORTIMER 1,983,389
START AND STOP CONTROL FOR POWER MACHINES
Original Filed June 19, 1931 3 Sheets-Sheet 3
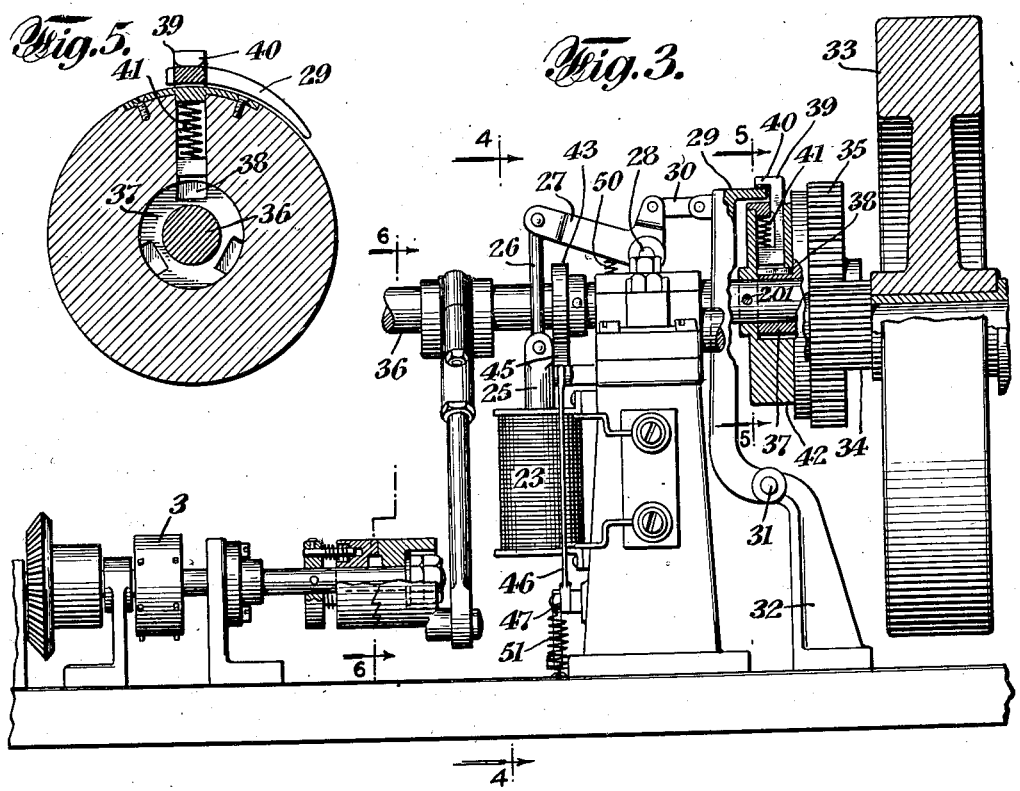
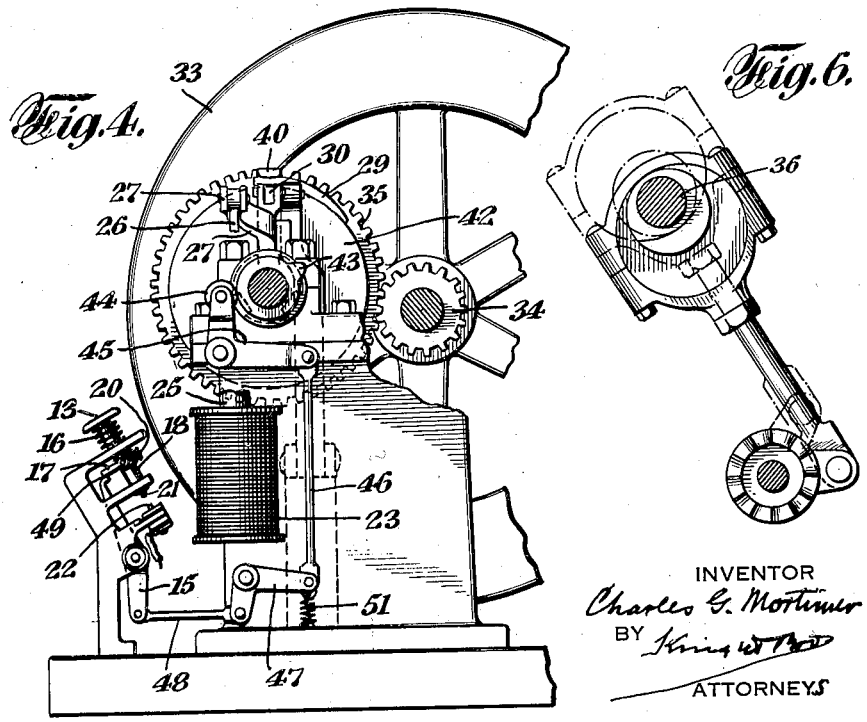
INVENTOR
Charles G. Mortimer
BY
ATTORNEYS Patented Dec. 4, 1934

1,983,389

UNITED STATES PATENT OFFICE 1,983,389

START AND STOP CONTROL FOR POWER MACHINES

Charles G. Mortimer, Glen Ridge, N. J., assignor to Joseph H. Lynch, Asbury Park, N. J.

Original application June 19, 1931, Serial No. 545,424. Divided and this application July 27, 1932, Serial No. 625,166

3 Claims. (Cl. 192—129)

The present invention relates to intermittent hand controlled starting and automatic stop devices for power machines. It is here illustrated in connection with a machine for forming, embossing and affixing tags for laundry, more fully described in my application for Letters Patent, Serial No. 545,424, filed June 19, 1931, of which the present application is a division.

The object of the present invention is a combination of mechanism whereby power machines may be started only when the work piece is in proper position, for instance a position of a piece of laundry, to receive a tag, and whereby the machine is automatically disconnected from the power source to stop the machine when it has completed a prearranged sequence of movements, whether or not the hand control has been released, and whereby the machine cannot be again started without a new placing of a work piece in position. The elements and combinations constituting the invention will first be fully described with reference to the accompanying drawings and then pointed out in the claims.

In said drawings—

Figure 1 is a rear view, with the casing in section, of a tag-forming, embossing and applying machine, illustrating an application of my invention.

Figure 2 is a cross-sectional view of the machine substantially along line 2—2, Figure 1, looking in the direction of the arrows.

Figure 3 is a rear view showing the coupling to connect the main shaft of the machine to the power drive and the feeding mechanism with its coupling, both couplings being shown partially in cross-section.

Figure 4 is a cross-sectional view substantially taken along line 4—4, Figure 3, and looking in the direction of the arrows.

Figure 5 is a cross-sectional view of the main clutch, taken substantially along line 5—5, Figure 3, and looking in the direction of the arrows.

Figure 6 shows the eccentrics and is a cross-sectional view, taken along the line 6—6, Figure 3, looking in the direction of the arrows, and Figure 7 is a diagram of the electric wiring and main operating switches.

The invention having been especially developed for application to a machine for forming, embossing and affixing tags to pieces of laundry, will be conveniently described in its preferred relation to such a machine, without thereby intending to limit the use of the invention to such a machine. In the drawings, 1 is the metal ribbon from which the tags are made. The metal ribbon comes from a magazine roll of conventional design, not shown. The ribbon runs over an idler 2, which acts as a guide and secures the contact of the ribbon with the feed roll 3 over a long part of its circumference. From this feed roller the ribbon is forced through straightening rolls 6, 7 and 8. After leaving the straightening rolls, the ribbon enters the die device 10 through slot 11 acting as a guide.

In order to convey the ribbon through the whole machine, the machine must be operated until the first finished tag appears at the slot 12, the front of the machine (Figure 2), or after five operations of the machine. The material to be identified is inserted into slot 12 and the identification tag applied, as described in the original application, of which this is a division.

The machine is started whenever the operator presses the push buttons 13, 13a. There is a pair of such buttons, one on either side of the platen 14. The piece of fabric, or whatever material must be provided with tags, is held on platen 14 and pushed into the slot 12 and it is apparent that the operator when holding the material can easily reach both buttons 13 and 13a. The operator automatically stretches the material over the platen 14 in order to reach the two buttons 13 and 13a located on the sides of the platen. This ensures that the tag is applied to an unwrinkled portion of the material, which, e. g. in the case of laundry, prevents wrinkles which would be ironed in later on.

Figure 7 is a diagram of the electric circuit into which buttons 13 and 13a are inserted. 200 is the source of electric power. The current flows from the + pole to the contact lever 15. As soon as button 13 is pressed against the resistance of spring 16, contact is made between the inturned point 49 of lever 15 and toe 17, pivoted on contact rod 18. Figure 7 shows this position. Toe 17 is normally held in a position perpendicular to the contact rod 18 by means of spring members 19 and tongue 20 which is an extension of the toe 17. Suitable insulation is provided to secure the flow of current in the above described way.

Further depression of the button 13 causes the toe 17 to be turned upwardly with respect to rod 18, as shown in dot and dash lines on Figure 7, and also causes contacting of the points 21 and 22. It must be noted that the toe 17 and the upper end of 15 remain in contact when 21 reaches 22. Flow of current is then established between 15 and the solenoid coil 23 up to terminal 24. By the simultaneous pressing of button 11a 13a, the complete circuit is closed. The contacts 49—17 are in series with contacts 21—22, and contact at 49—17 is maintained when the contact is made at 21—22.

As soon as power is by this means supplied to 23, the solenoid core 25 is pulled into the coil and takes with it connecting rod 26 and bell crank 27 which is fulcrummed at 28 and linked to cam track 29 by means of link 30. Cam track 29 is pivoted at 31 to a stationary support 32.

The fly wheel 33 is driven by a belt or the like from a motor not shown. A pinion 34 is attached to 33 and engages with a tooth wheel 35 which is free on shaft 36. To the wheel 35 a collar 37 is attached. This collar is provided with a plurality of notches 38, shown on a large scale on Figure 5. These notches are adapted to receive the inner end of clutch dog 39. This dog is held up by means of the arc-shaped cam track 29 riding under the lip 40. It engages with one of the notches 38 as soon as 29 is removed from the holding lip 40 of dog 39 by the already-described mechanical operations following the energizing of solenoid 23; thereupon it drops into one of the notches 38 owing to pressure of the spring 41. It will be noted that a plurality of notches 38 are provided to reduce the intermission between the moment the push buttons 13 and 13a are depressed, and the moment the shaft 36 begins to revolve.

Clutch dog 39 slides in a radial slot in the clutch plate 42 which is pinned onto shaft 36 by means of pin 201. This pin is a safeguard against overloading other vital parts of the machine and will be of sufficiently soft material or small size to limit the power transmitted by 36.

As soon as clutch dog 39 engages with one of the notches 38, the shaft 36 will be turned one turn or until the dog lip 40 rides up on cam track 29. This cam track goes back into its original position as soon as shaft 36 and disc 42 have revolved enough to allow a return of 29 without interfering with 39. This is accomplished by a cam 43 on shaft 36, which engages with a cam follower 44, Figure 4. 44 operates via the bell crank 45, a link 46, another bell crank 47, and another link 48, the contact lever 15, shown also on Figure 7. Thus the engagement of the cam 43 causes a disengagement of contact lever point 49 and contact toe 17. The power applied to the solenoid 23 is interrupted no matter whether buttons 13 and 13a are still pressed or not and the cam track 29 is brought back to its original position to engage under lip 40 by means of a spring 50. The engagement of cam follower 44 and cam 43 is secured by means of spring 51. The last-described operation may be designated as a clutch safety release. This definitely insures that shaft 36 is stopped again after having made one full turn, no matter whether the push buttons are depressed during this period or are left depressed by inadvertence. The push buttons must be released before operating the machine a second time. This will cause the operator to withdraw the piece onto which the tag was applied and will help to prevent two or more tags from being applied at the same point.

When contact lever 15 is operated from cam 43, a free snapping of toe 17 into the position 53, shown by dotted lines on Figure 7, is secured. Upon releasing button 13, the contact pin goes back and contact points 21 and 22 are disengaged. If 15 moves back because of further turning of cam 43 before the button 13 was released, the toe 17 would pass the point 49 upon releasing of 13 and go back to the uppermost position.

It is obvious from the above that shaft 36 cannot make one full revolution without the driven coupling member 42 being disconnected from the driving member 37, and during this revolution, the various operations of the machine upon the ribbon and tag are performed, all the mechanisms performing such operations being operatively connected to the main shaft 36.

I claim:—

1. In a machine of the character described, the combination of driving and driven members, a releasable coupling for said members, and means for controlling said coupling, comprising an electric circuit which includes, in series, an electro-magnet, a switch manually operated for closing the circuit to engage the coupling and automatically operated to open the circuit, when manual control is released, and an automatic switch actuated by the driven member to open the circuit and disengage the coupling when the driven member has completed a predetermined angular movement.

2. In a machine of the character described, the combination of a driving member, a driven member, a releasable coupling for said members, and an electric circuit controlling said coupling and comprising a normally open manually controlled switch, the closing of which causes the engaging of the coupling, and a normally closed automatically controlled switch cooperating with a movable member of the manually controlled switch to maintain the circuit through the automatically controlled switch when the manually controlled switch is closed, and opened by the driven member, independently of the position of the manually controlled switch, when the driven member has completed a predetermined movement.

3. In a machine of the character described, the combination of a driving shaft, a driven shaft having peripherally arranged notches and a releasable coupling for said shafts, comprising a clutch plate on the driving shaft having a radially movable clutch dog to engage the notches of the driven shaft, an arc-shaped cam track, pivotally supported on the machine frame and movable axially of the said shafts to engage said dog and move it out of engagement with said notches, and manually operated means for moving the cam track out of the path of said dog.

CHARLES G. MORTIMER.